United States Patent
Tuff

(10) Patent No.: US 7,853,375 B2
(45) Date of Patent: Dec. 14, 2010

(54) VEHICLE MONITOR

(76) Inventor: Maurice Tuff, 80 Castors Dr., Mount Pearl, NF (CA) A1N 5K5

(*) Notice: Subject to any disclaimer, the term of this patent is extended or adjusted under 35 U.S.C. 154(b) by 350 days.

(21) Appl. No.: 11/733,392

(22) Filed: Apr. 10, 2007

(65) Prior Publication Data

US 2008/0255718 A1   Oct. 16, 2008

(51) Int. Cl.
*G01M 17/00* (2006.01)
*G06F 7/00* (2006.01)
*G06F 19/00* (2006.01)

(52) U.S. Cl. .............................. 701/33; 701/29; 701/35
(58) Field of Classification Search .................... 701/29
See application file for complete search history.

(56) References Cited

U.S. PATENT DOCUMENTS

| | | | |
|---|---|---|---|
| 4,843,578 A | 6/1989 | Wade | |
| 4,939,652 A | 7/1990 | Steiner | |
| 5,448,561 A | 9/1995 | Kaiser et al. | |
| 5,499,182 A * | 3/1996 | Ousborne | 701/35 |
| 5,550,738 A | 8/1996 | Bailey et al. | |
| 5,758,300 A | 5/1998 | Abe | |
| 5,797,134 A | 8/1998 | McMillan et al. | |
| 6,064,970 A | 5/2000 | McMillan et al. | |
| 6,075,454 A * | 6/2000 | Yamasaki | 340/5.61 |
| 6,141,610 A * | 10/2000 | Rothert et al. | 701/35 |
| 6,240,773 B1 * | 6/2001 | Rita et al. | 73/114.01 |
| 6,263,268 B1 * | 7/2001 | Nathanson | 701/29 |
| 6,278,921 B1 | 8/2001 | Harrison et al. | |
| 6,629,029 B1 | 9/2003 | Giles | |
| 6,701,234 B1 * | 3/2004 | Vogelsang | 701/35 |
| 6,832,141 B2 | 12/2004 | Skeen et al. | |
| 6,865,457 B1 | 3/2005 | Mittelstead et al. | |
| 6,868,386 B1 | 3/2005 | Henderson et al. | |
| 6,895,310 B1 * | 5/2005 | Kolls | 701/1 |
| 6,931,309 B2 | 8/2005 | Phelan et al. | |
| 6,972,668 B2 * | 12/2005 | Schauble | 340/438 |
| 7,363,149 B2 * | 4/2008 | Klausner et al. | 701/207 |
| 7,504,931 B2 | 3/2009 | Nguyen | |
| 2002/0018513 A1 * | 2/2002 | Curry et al. | 374/178 |

(Continued)

FOREIGN PATENT DOCUMENTS

DE   195 22 937 A1   1/1995

(Continued)

OTHER PUBLICATIONS

International Search Report and Written Opinion mailed on Jul. 29, 2008.
CarChip® Installation Instructions for Models 8211, 8221 and 8225. Davis Instruments, CarChip®, CarChip E/X, CarChip E/X With Alarm, OBDII—Based Vehicle Data Logger and Software, Rev. B, Feb. 23, 2007.

(Continued)

*Primary Examiner*—Jack Keith
*Assistant Examiner*—Rami Khatib
(74) *Attorney, Agent, or Firm*—Bereskin & Parr LLP

(57) ABSTRACT

A system and method is disclosed for monitoring a motor vehicle. The system includes a sensor unit for collecting at least one vehicle statistic and a portable device for displaying the vehicle statistics. The portable device requests the vehicle statistics from the sensor unit at regular intervals or in response to a particular event and displays statistics on a built-in display screen. In one embodiment, the portable device may be attached to the keys used to operate the vehicle being monitored.

56 Claims, 9 Drawing Sheets

U.S. PATENT DOCUMENTS

| | | | |
|---|---|---|---|
| 2003/0182033 A1* | 9/2003 | Underdahl et al. | 701/29 |
| 2004/0083041 A1* | 4/2004 | Skeen et al. | 701/35 |
| 2005/0096809 A1 | 5/2005 | Skeen et al. | |
| 2005/0146458 A1* | 7/2005 | Carmichael et al. | 342/52 |
| 2006/0229777 A1* | 10/2006 | Hudson et al. | 701/29 |
| 2007/0262848 A1 | 11/2007 | Berstis et al. | |
| 2008/0042489 A1* | 2/2008 | Lewis et al. | 303/152 |

FOREIGN PATENT DOCUMENTS

| | | |
|---|---|---|
| DE | 100 55 059 A1 | 5/2002 |
| DE | 20 2004 011 207 U1 | 3/2005 |
| DE | 10 2006 011 704 A1 | 10/2006 |
| EP | 0 239 066 A1 | 9/1987 |
| WO | WO 03/034089 | 4/2003 |

OTHER PUBLICATIONS

Davis Instruments, carchip™ What if you could read your car's mind?, 2002.

Applied Expert Systems Inc. (APEXS, Inc.) V-Count 2 Set-up Procedures Vehicle & Driver Safety Monitor.

Applied Expert Systems Inc. (APEXS, Inc.) Vehicle Speed Monitor VSM V-Count II Reed Switch (RS) Installation Guide, 2003.

Davis Instruments Corp, Davis DriveRight® VSS Installation Guide, Product No. 8155VSS, 8155VF, 8160VSS, 8160VF, Rev. D Manual (Jul. 18, 2001).

* cited by examiner

US 7,853,375 B2

VEHICLE MONITOR

FIELD

The embodiments described herein relate to a system and method for vehicle monitoring and more particularly to a system and method for collecting and displaying vehicle statistics.

BACKGROUND

With more young drivers getting licenses each year, there has been an unfortunate increase in accidents along with the ensuing damage, debilitating injuries and sometimes death. Most of these accidents are attributable to speeding and general poor driving habits. In North America, automobile accidents are currently the number one killer of teenagers. Moreover, the economic impact of these accidents is paid for by all drivers through increased insurance premiums. If parents and guardians had a way of monitoring the driving habits of minors they could take appropriate action in response to reckless driving. Furthermore, knowing that a parent or guardian was monitoring their driving habits might make a minor less likely to drive recklessly in the first place. There are also other situations in which the owner of a vehicle may wish to monitor the use of the vehicle, such as when a corporate vehicle is driven by an employee or a rental vehicle is driven by a customer.

There are a number of ways in which vehicle statistics, such as speed and distance, may be tracked. For instance, speedometers, accelerometers, GPS technologies and OBD-II ports are currently available in some or all vehicles. OBD-II ports, for example, are available in all post-1996 vehicles. An OBD-II port is a standardized digital communications port designed to provide real-time data regarding vehicle functioning in addition to a standardized series of diagnostic trouble codes. This data may be collected by connecting a device to the OBD-II port which is capable of communicating using, for example, the SAE J1850 standard.

A number of products have been introduced which take advantage of available vehicle data collection technologies in order to allow vehicle operation to be monitored. However, many of these products are not very convenient to use and often all or part of the device must be connected to a computer before the vehicle statistics can be accessed.

SUMMARY

In one aspect, at least one embodiment described herein provides a system for monitoring a vehicle, the system comprising a sensor unit for collecting at least one vehicle statistic and a portable device. The portable device comprises a processor configured to control the portable device and request and receive the at least one vehicle statistic from the sensor unit; a display for displaying at least one of the at least one vehicle statistic; and a transceiver configured to communicate with the sensor unit.

In another aspect, at least one embodiment described herein provides a portable device for displaying at least one vehicle statistic for a vehicle. The portable device comprises a transceiver configured to communicate with a sensor unit that collects at least one vehicle statistic; a processor configured to control the portable device and request and receive the at least one vehicle statistic; and a display for displaying at least one of the at least one vehicle statistic. The portable device is a handheld device.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1A:
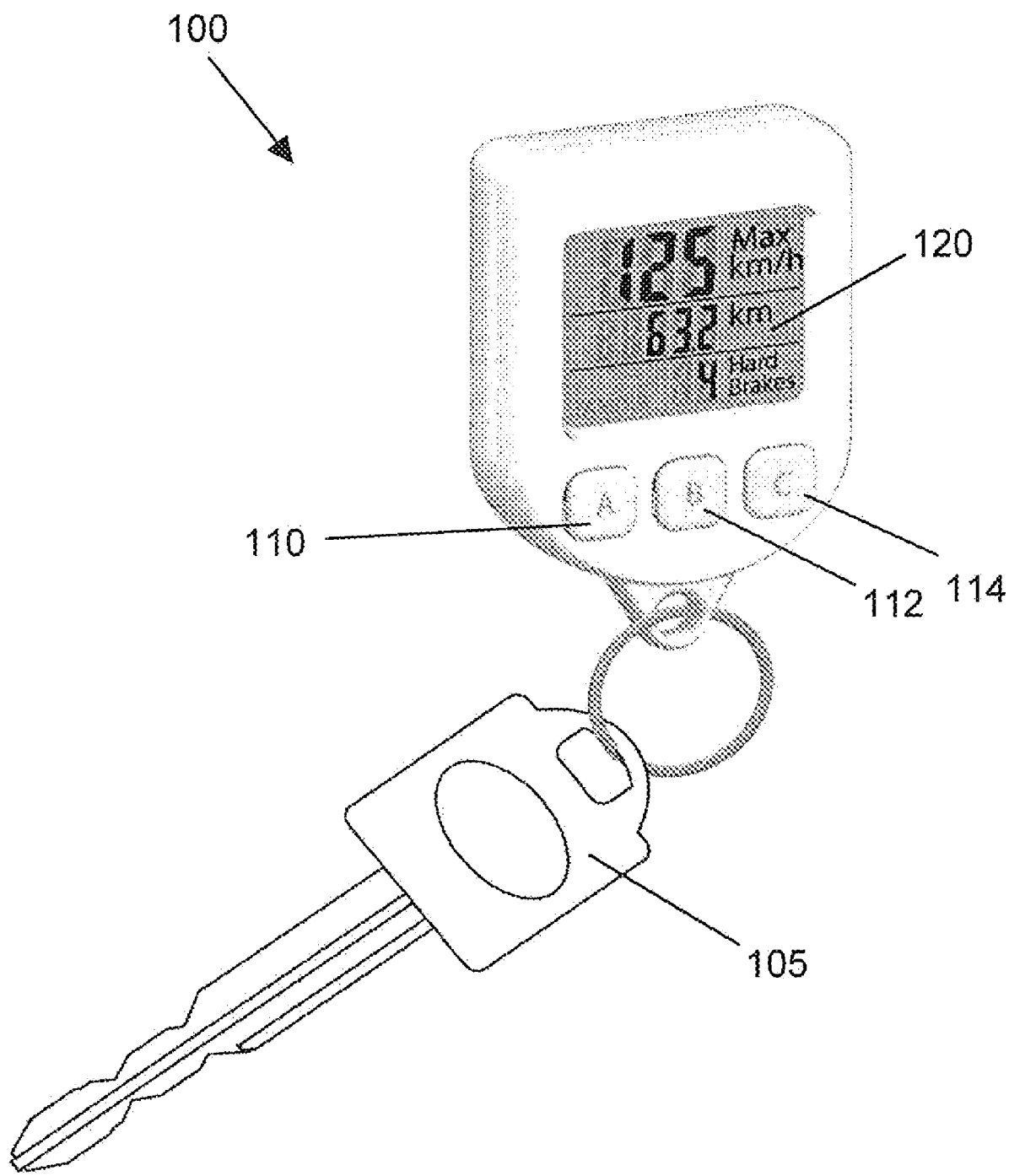
FIG. 1A is a diagram of a portable device according to one exemplary embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Reference is first made to FIG. 1A, which illustrates a portable device 100 according to one exemplary embodiment of the invention. The portable device 100 includes a display 120, for displaying vehicle statistics, and three input buttons 110, 112, and 114, for receiving input from the user. In this illustration, the portable device 100 is removably attachable to the key 105 used to operate the vehicle to be monitored.

The input buttons 110, 112, and 114 have a variety of functions. The first button 110 is a synchronization button. If the synchronization button 110 is pressed and released then the display 120 will toggle between a metric mode and an imperial mode. If the synchronization button 110 is held for at least three seconds then the display 120 will toggle between a main mode and a synchronization mode. The synchronization mode will be discussed in further detail with reference to FIG. 5.

The second button 112 is a reset button. If the reset button 112 is pressed and released, the portable device 100 will request updated vehicle statistics from a sensor unit 150. If the reset button 112 is held for at least three seconds then the portable device 100 will enter a reset mode. The reset mode will be discussed in further detail with reference to FIG. 7. From the reset mode, the reset button 112 allows an access code to be entered.

The last button 114 is a code button. The code button 114 will cause the portable device 100 to enter into a change code mode when held for at least three seconds. The change code mode will be discussed in greater detail with reference to FIG. 6. Once in the change code mode, the reset button 112 can be used to increment each digit and the code button 114 is used to confirm the digits that are selected. The current code must be entered using the reset and code buttons before the code can be changed. Once the current code has been verified, the new code can be entered. The code allows the user to access certain functions on the portable device 100 and provides a level of security.

Figure 1C:
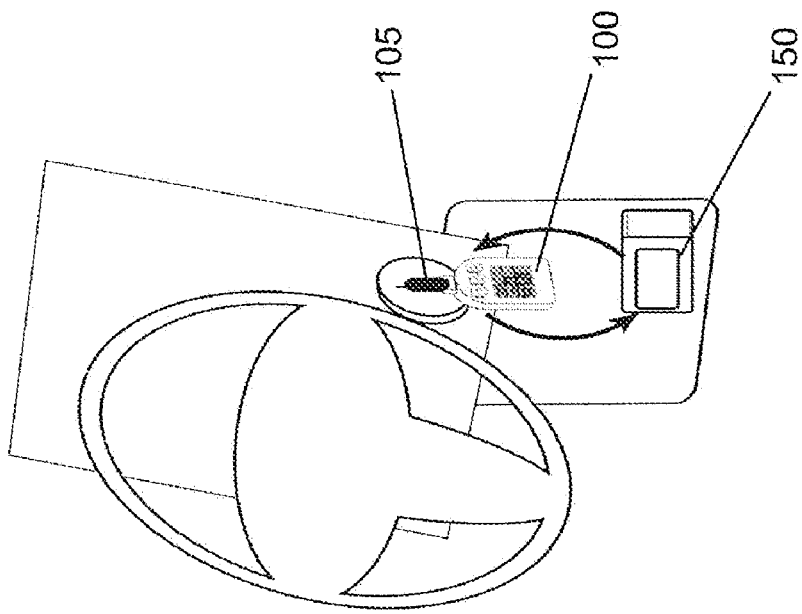
FIG. 1C is a diagram showing the portable device of FIG. 1A and the sensor unit of FIG. 1B in use.
Figure 1B:
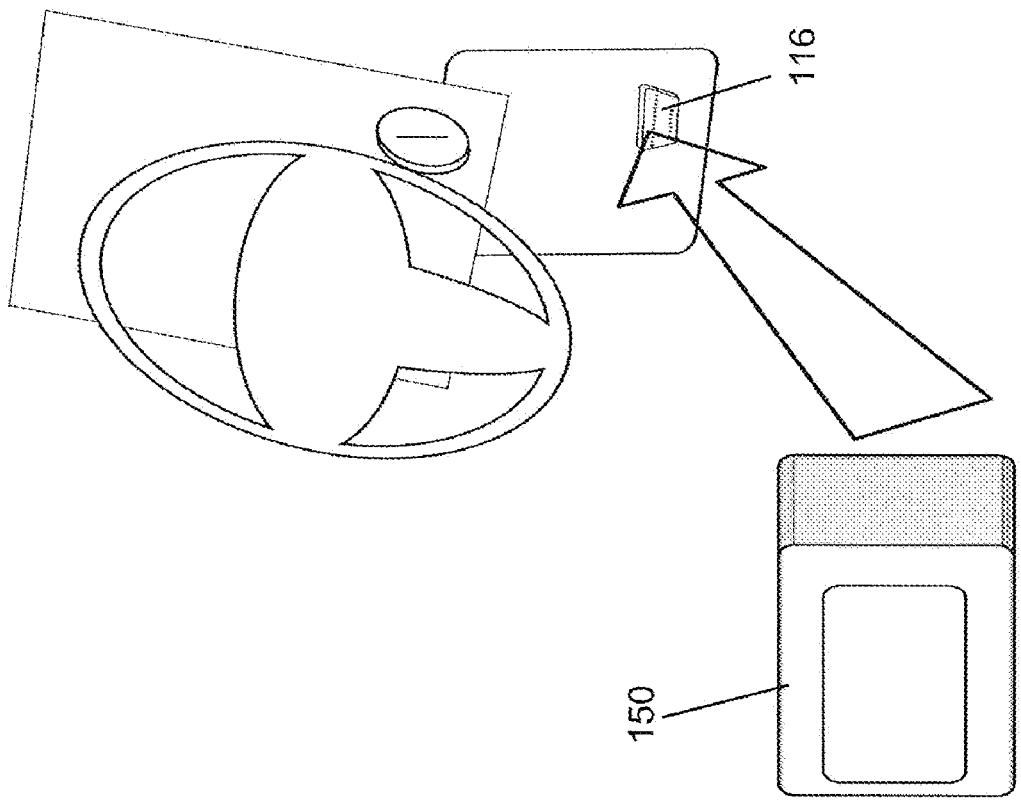
FIG. 1B is a diagram showing a sensor unit according to one exemplary embodiment being attached to a vehicle.

Referring now to FIG. 1B, a sensor unit 150 is shown which is releasably attachable to a port 116 of the vehicle to be monitored. In this embodiment, the port 116 is an OBD-II port but other embodiments can use other technology and techniques which allow for the collection of vehicle statistics, such as accelerometers, speedometers or GPS systems and the like.

Referring now to FIG. 1C, the sensor unit 150 is shown attached to the OBD-II port 116 of the vehicle. The sensor unit 150 communicates with the portable device 100 which is releasably attachable to the vehicle key 105.

Figure 2:
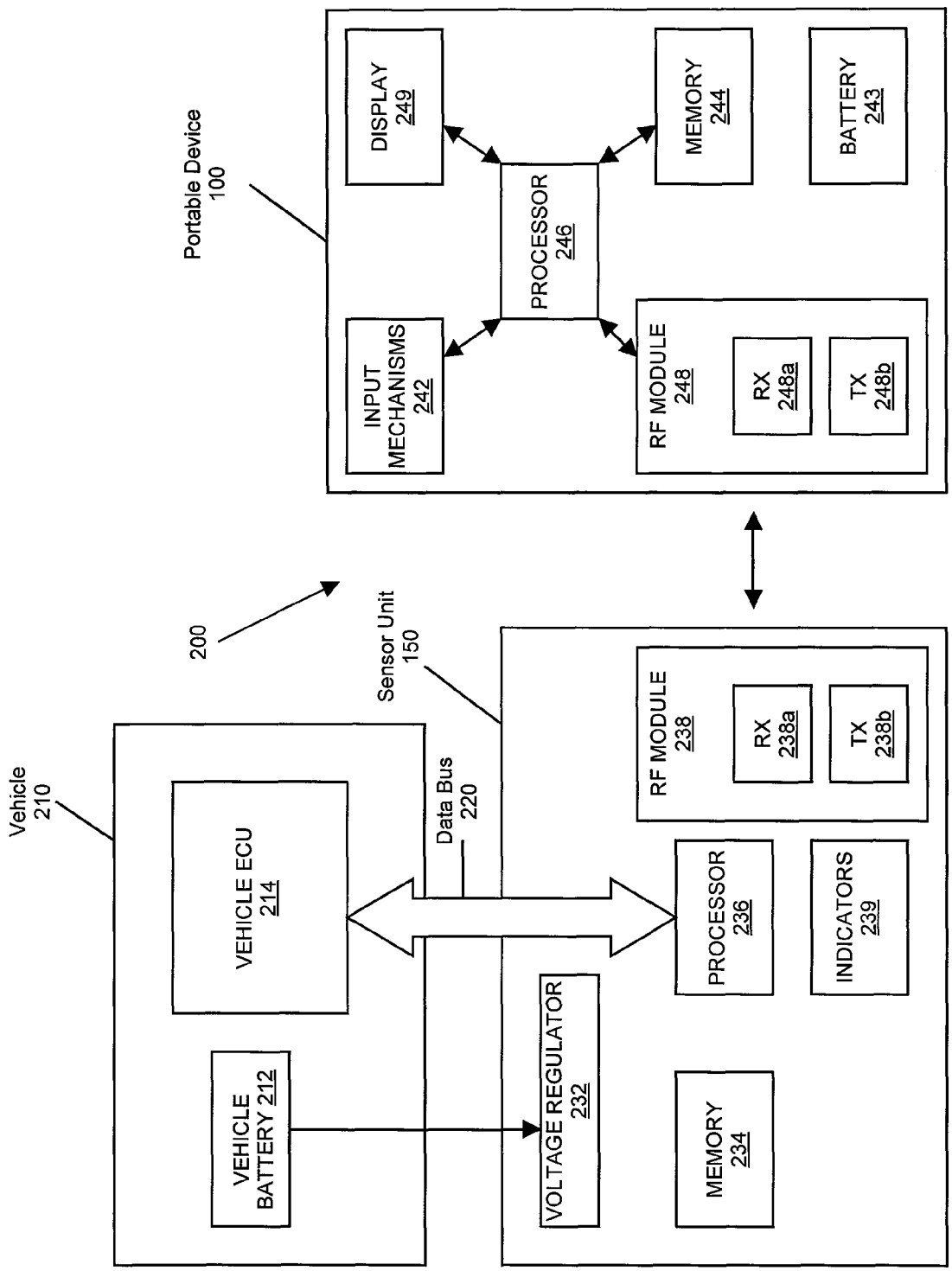
FIG. 2 is a block diagram of a vehicle monitoring system.

Reference will now be made to FIG. 2 which illustrates the components for an exemplary embodiment of a vehicle monitoring system 200. The vehicle monitoring system 200 includes the portable device 100 and the sensor unit 150 which communicates with the monitored vehicle 210 through data bus 220. The portable device 100 and the sensor unit 150 communicate using two radio frequency (RF) modules 248 and 238.

The vehicle 210 includes, among many other components, a vehicle battery 212 and a vehicle engine control unit (ECU) 214. The vehicle battery 212 can be used to provide power to the sensor unit 150. The vehicle ECU 214 captures vehicle information and responds to information requests from the sensor unit 150. The sensor unit 150 will continually query the vehicle ECU 214 for the current speed of the vehicle 210 through the data bus 220.

The sensor unit 150 connects to the type A vehicle connector of the vehicle 210 as specified in the SAE J1962 standard. The sensor unit 150 includes, but is not limited to, a voltage regulator 232, a memory 234, a processor 236, two indicators 239 and an RF module 238.

As mentioned above, the RF module 238 is used to communicate with the portable device 100. The RF module 238 consists of receiver circuitry 238a (RX) and transmitter circuitry 238b (TX). The indicators 239 inform the user of the state of the sensor unit 150 (i.e. if it is functional). The indicators may be light-emitting diodes (LEDs) or the like. The memory 234 is a nonvolatile memory, such as an EEPROM, used to store statistics and data in case power is removed from the sensor unit 150. The processor 236, such as a microcontroller unit (MCU), controls the operations of the sensor unit 150. Finally, the voltage regulator 232 connects to the vehicle battery 212. The voltage regulator 232 drops the 12 volts supplied by the vehicle battery to 5 volts needed by the sensor unit 150.

The portable device 100 may be a key fob unit, similar to a car starter key fob, or any other portable device. It includes, but is not limited to, a group of input mechanisms 242, a battery 243, a memory 244, a processor 246, an RF module 248 and a display 249.

As mentioned above, the RF module 248 is used to communicate with the sensor unit 150. The RF module 248 consists of receiver circuitry 248a (RX) and transmitter circuitry 248b (TX). The input mechanisms 242 such as input buttons, are used by the user to enter information or change settings on the portable device 100. The display 249 displays information to the user, including, but not limited to, vehicle statistics. The memory 244 is a nonvolatile memory, such as an EEPROM, used to store statistics and data in case power is removed from the portable device 100. The processor 246 controls the operations of the portable device 100. Finally, the battery 243 provides power to the portable device 100.

The sensor unit 150 will normally remain attached to the vehicle 210 while the portable device 100, which contains the same vehicle statistics as the sensor unit 150, may be easily transported to and from the vehicle 210. Since the portable device 100 is portable, the driving habits of a driver may be monitored without the need to enter the vehicle 210 or even to be in proximity of the vehicle 210. Since the sensor unit 150 normally remains attached to the vehicle 210, there is no possibility that a driver will mistakenly forget to attach it prior to operating the vehicle 210. Even if the portable device is not in proximity of the vehicle 210 when the vehicle is being operated, for example if the portable device is left at home, the sensor unit 150 will continue to collect statistics.

In some embodiments, the portable device 100 may be removably attached to the keys used to operate the vehicle 210 or to any other object or personal item but preferably to an object which would normally accompany a driver in the vehicle 210. Attaching the portable device 100 in such a way reduces the likelihood that the vehicle 210 will mistakenly be operated without the portable device 100 being present, thus increasing the likelihood that the statistics displayed on the portable device will be up to date. Alternatively, the portable device 100 may be placed in a wallet or purse or similar personal item.

As the vehicle statistics are displayed on the portable device 100 itself, there is no need for any other equipment, such as a personal computer, to monitor the usage of the vehicle 210.

Figure 3:
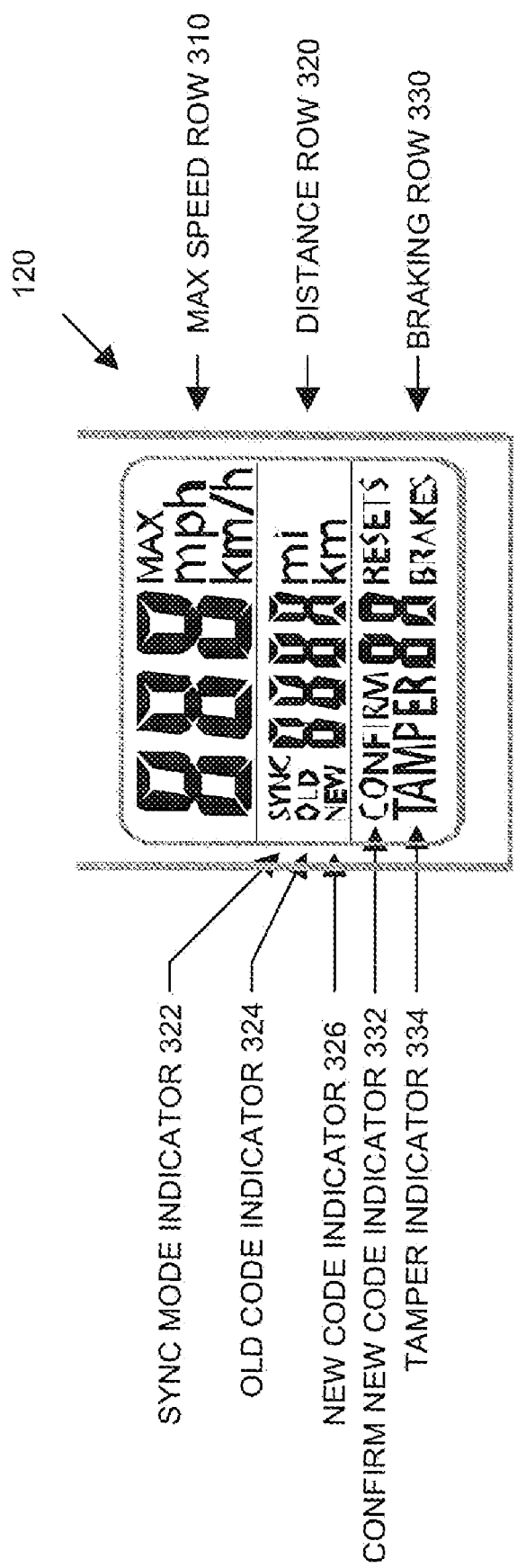
FIG. 3 is a diagram showing a display of the portable device of FIG. 1A.

Reference will now be made to FIG. 3 which illustrates the display 120 of the portable device 100 in more detail. The display includes several fields of information. In the exemplary embodiment, there are three fields including a maximum speed field 310, a distance field 320 and a braking field 330.

The maximum speed field 310 displays the maximum speed which the vehicle 210 has attained since the last time the portable device 100 was reset. The maximum speed may be displayed in metric (km/h) or imperial (mph) depending on the display mode of the portable device 100.

The distance field 320 displays the distance the vehicle 210 has traveled since the last time the portable device 100 was reset. The distance may be displayed in metric (km) or imperial (mi) depending on the display mode of the portable device 100. The distance field 320 also includes three indicators 322, 324 and 326. The sync mode indicator 322 is present when the portable device 100 is in synchronization mode. The old code indicator 324 is present during a change code operation to indicate that the old access code is to be entered. The new code indicator 326 is present during a change code operation to indicate that the new access code is to be entered.

The braking field 330 displays the number of times that a driver of the vehicle 210 has slammed on the brakes since the last time the portable device 100 was reset. This may be calculated by keeping track of the number of times in which the vehicle 210 has experienced a specified reduction in speed in a specified period of time. When the reset button 112 is held for at least three seconds then the braking field 330 will display the number of times that the portable device 100 has been reset. The braking field 330 also includes two indicators 332 and 334. The confirm new code indicator 332 is present during a change code operation to indicate that a new access code needs to be confirmed. The tamper indicator 334 indicates that tampering has been detected.

Figure 4:
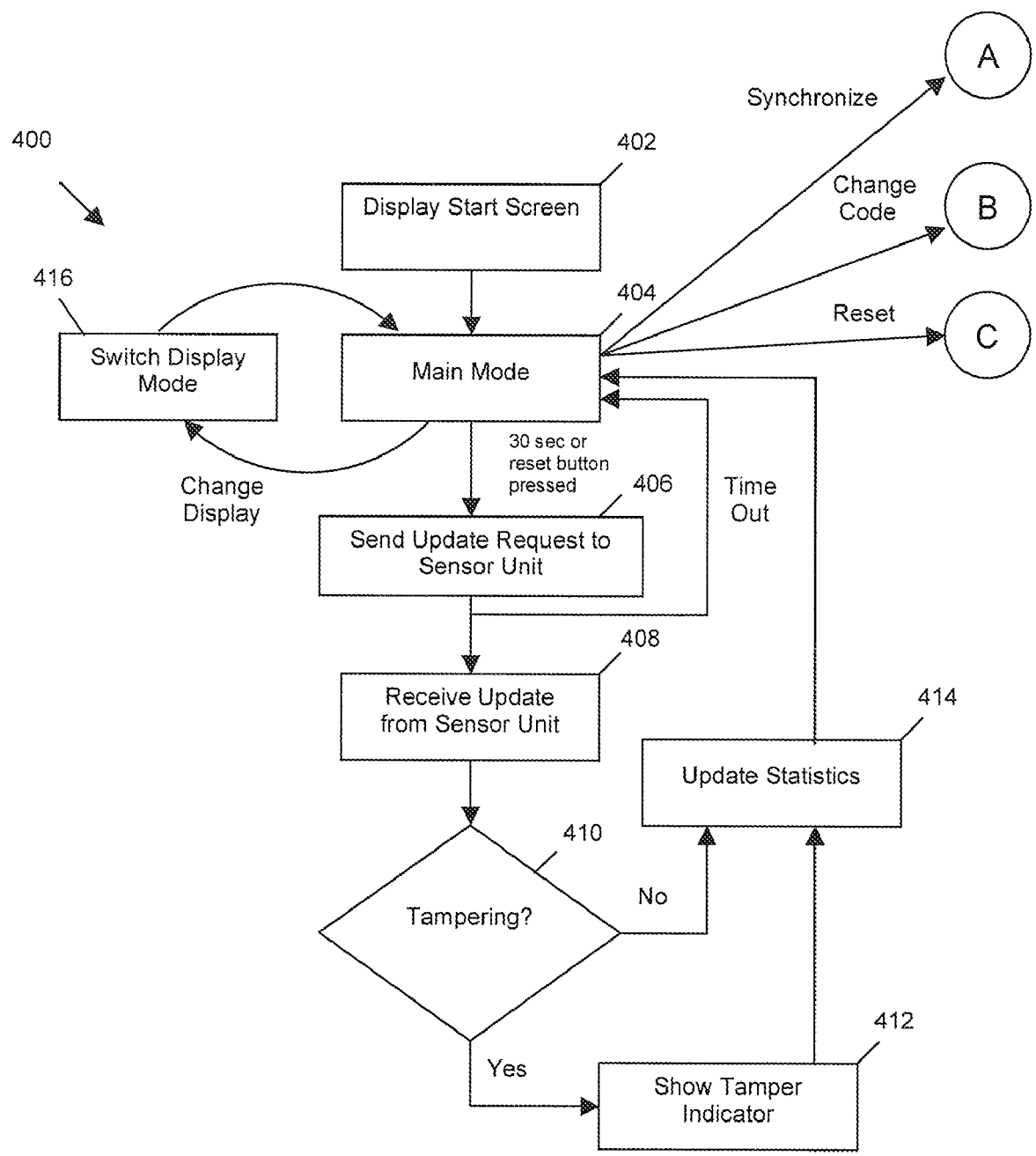
FIG. 4 is a flowchart diagram illustrating the steps for an exemplary embodiment of a method used to display and update vehicle statistics on the portable device.

Referring now to FIG. 4, there is shown a flowchart diagram that illustrates a method 400 used to display and update vehicle statistics on the portable device 100. The method 400 starts at step 402 where the portable device 100 is first initiated and a start screen is displayed. The method 400 then proceeds to step 404 where the portable device 100 enters the main mode in which it waits to receive input from the user or for 30 seconds to pass with no input from the user.

The portable device 100 will remain in the main mode until 30 seconds passes or until it receives input from the user. If the user presses the synchronization button 110 for less than three seconds, the method 400 proceeds to step 416 where the display mode will be changed from metric to imperial or from imperial to metric. If the synchronization button 110 is pressed for three seconds or more, the portable device 100 will enter the synchronization mode which will be discussed in relation to FIG. 5. If the code button 114 is pressed for at least three seconds, the portable device 100 will enter the change code mode which will be discussed in relation to FIG. 6. If the reset button 112 is pressed for three seconds or more then the portable device 100 will enter the reset mode which will be discussed in relation to FIG. 7. If the reset button 114 is pressed for less than three seconds or if 30 seconds passes without any user input, the method 400 will proceed to step 406 to get updated vehicle statistics from the sensor unit 150.

At step 406, the portable device 100 requests an update from the sensor unit 150. If no response is received within a certain period of time (i.e., within 20 ms) then the portable device 100 times out, the receiver circuitry 248a of the RF module 248 shuts down to conserve energy and the method 400 returns to the main mode in step 404.

As will be discussed in relation to FIG. 5, each portable device 100 has a unique device identification number and each sensor unit 150 has a sensor identification number which matches the device identification number of the portable device 100 to which it has been synchronized. The portable device 100 will include its device identification number in each update request sent to the sensor unit 150 and the sensor unit 150 will only respond to update requests containing a matching identification number. This fact, along with the short time out period, means that the sensor unit 150 does not need to send its sensor identification number with each update message. This provides for shorter update messages from the sensor unit 150 and, hence, shorter response times which allows the portable device 100 to use an even shorter time out period and increases the life of the battery 243.

If a message is sent from the sensor unit 150 before the portable device 100 times out then the method 400 proceeds to step 408. At step 408, the portable device 100 receives an update message from the sensor unit 150. This update message will include each of the statistics displayed on the portable device 100.

The sensor unit 150 will keep a power cycle count of the number of times it has been powered up (i.e. the number of times it has been connected to the vehicle). This information will be sent to the portable device 100 each time an update message is sent. The portable device 100 will store the power cycle count received in the first message after the most recent reset operation. At step 410, the power cycle count received from the sensor unit 150 will be compared to the power cycle count stored in the portable device 100. If the two counts do not match, it is assumed that someone has removed the sensor 150 from port 116 and driven the vehicle 210 without the use of the sensor 150. This is considered to be tampering and, hence, the tamper indicator 334 is shown at step 412. The tamper indicator 334 will be displayed until the portable device 100 is reset as will be described with reference to FIG. 7. The method 400 then proceeds to step 414. If the two counts do match, on the other hand, the method 400 proceeds directly to step 414.

At step 414, the statistics on the display 120 of the portable device 100 and in memory 244 are updated and the portable device 100 returns to the main mode at step 404.

Figure 5:
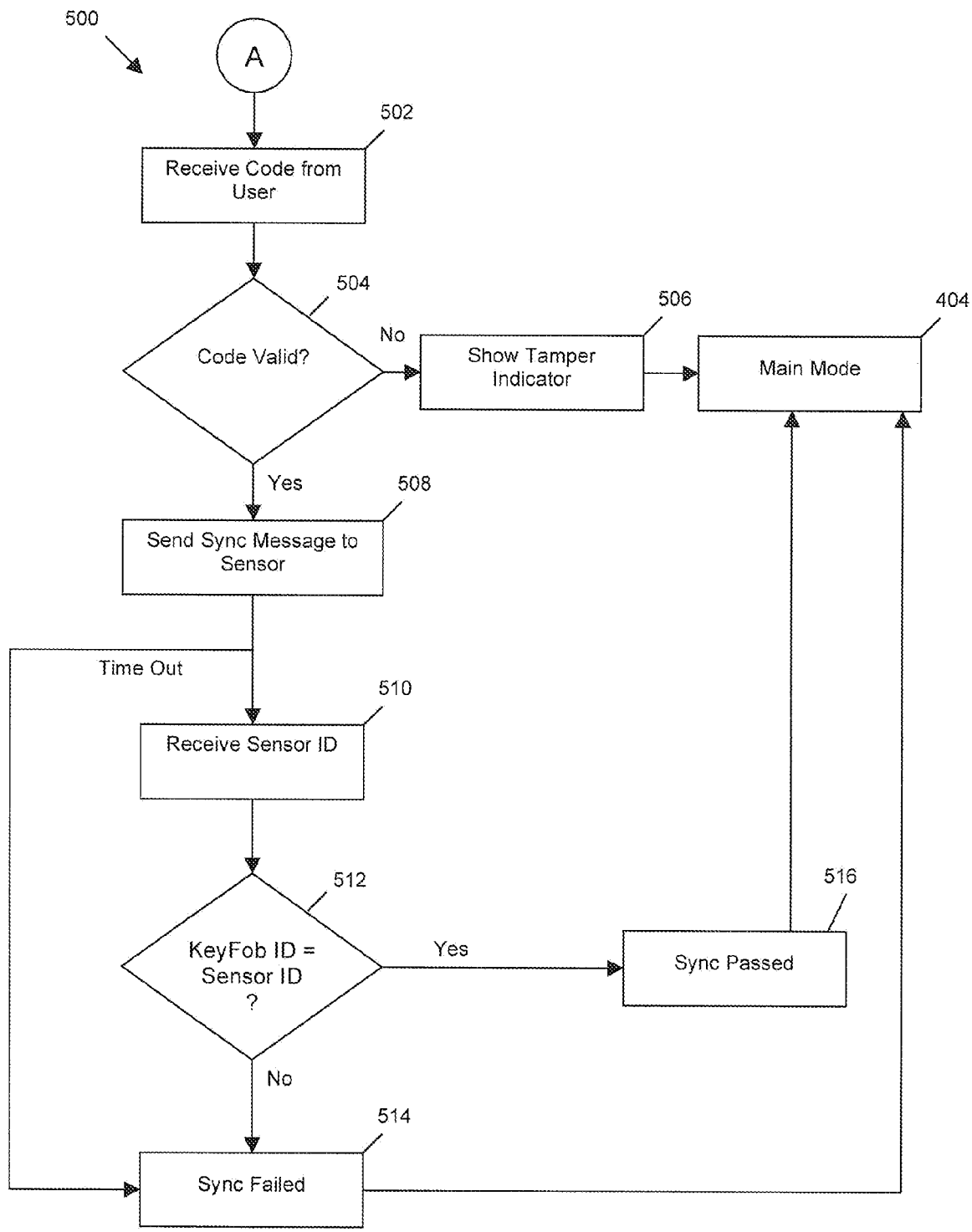
FIG. 5 is a flowchart diagram illustrating the steps for an exemplary embodiment of a method used to synchronize the portable display with the sensor unit.

Referring now to FIG. 5, there is shown a flowchart diagram which illustrates an exemplary embodiment of a method 500 used to synchronize the portable device 100 with the sensor unit 150. There are two main purposes of synchronization. First, synchronization is used to avoid interference between sensor units and portable devices from different systems (i.e. so that a user will not mistakenly read vehicle information from the sensor unit of a neighboring vehicle or purposefully read the statistics from a sensor unit with more "acceptable" values. Second, synchronization makes it difficult for data to be retrieved from the sensor unit 150 without the associated portable device 100, allowing the data to remain private from unauthorized persons. Synchronization is required when installing the sensor for the first time.

The method 500 is initiated when the portable device 100 enters the synchronization mode. At this point, the sync mode indicator 322 is activated. At step 502, the portable device 100 receives an access code from the user. The validity of this access code is checked at step 504. If it is not a valid code, the tamper indicator 334 is activated at step 506 and the portable device 100 returns to the main mode at step 404. If a valid code has been entered, the method 500 proceeds to step 508 to attempt a synchronization.

At step 508, the portable device 100 sends a synchronization message to the sensor unit 150. As mentioned above, each portable device 100 has a unique device identification number that can be factory set or randomly generated when user enters the synchronization mode. If the sensor unit 150 is prepared to synchronize, at step 510 it receives the device identification number from the portable device 100 in the synchronization message and this number becomes the sensor identification number. The sensor unit 150 then sends a message back to the portable device 100 including its newly set sensor identification number. If the sensor unit is not prepared to synchronize, no message is sent back from the sensor unit 150, the portable device times out, the synchronization fails and a fail message appears on the display 120 at step 514. The method 500 returns to the main mode in step 404. The sensor unit 150 and the portable device 100 will not be able to communicate until a synchronization has been successful.

At step 512, the sensor identification number received from the sensor unit 150 is compared to the portable device's 100 device identification number. If they are equal, the synchronization has passed. At step 516, a pass message appears on the display 120 and the portable device 100 returns to the main mode at step 404. If the two identification numbers are not equal, the synchronization fails and a fail message appears on the display 120 at step 514. The method 500 returns to the main mode in step 404. The sensor unit 150 and the portable device 100 will not be able to communicate until a synchronization has been successful.

Figure 6:
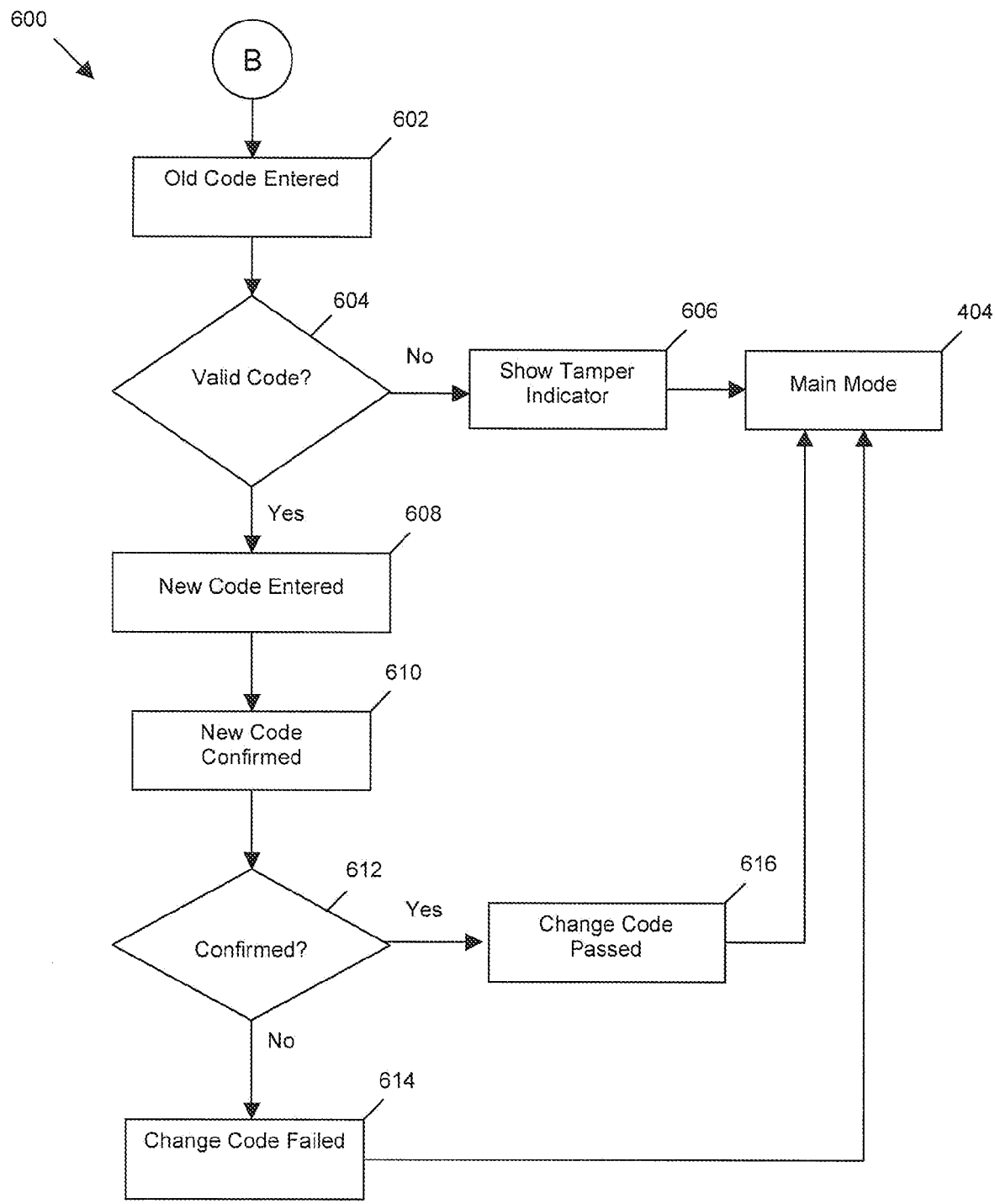
FIG. 6 is a flowchart diagram illustrating the steps for an exemplary embodiment of a method used to change the access code on the portable display.

Referring now to FIG. 6, there is shown a flowchart diagram that illustrates an exemplary embodiment of a method 600 used to change the access code on the portable device 100. The method 600 is initiated when the portable device 100 enters the change code mode. The access code is required each time the information stored and displayed on the portable device 100 is reset. This code is initialized during manufacture and can be changed thereafter. An authorized user may wish to change this access code initially to prevent unauthorized users from resetting the portable device and then periodically or whenever it is suspected that an unauthorized user may have discovered the current access code in order to ensure the integrity of the information.

At step 602, the old code indicator is activated and the portable device 100 receives the old access code from the user. The validity of this access code is checked at step 604. If it is not a valid code, the tamper indicator 334 is activated at step 606 and the portable device 100 returns to the main mode at step 404. If a valid code has been entered, the method 600 proceeds to step 608.

At step 608, the new code indicator 326 is activated and a new access code is entered. At step 610, both the new code indicator 326 and the confirm new code indicator 332 are activated and the new code is entered for a second time in order to confirm the new access code. If the same code is entered in steps 608 and 610 then the new code is confirmed at step 612 and the method 600 proceeds to step 616. At step 616, the access code is changed to the new access code, a pass message is displayed on the display 120 and the portable device 100 returns to the main mode at step 404. If the same code is not entered in steps 608 and 610 then the code is not confirmed at step 612 and the method 600 proceeds to step 614. At step 614, a fail message is displayed on the display 120 and the portable device 100 returns to the main mode at step 404 without having changed the access code.

Figure 7:
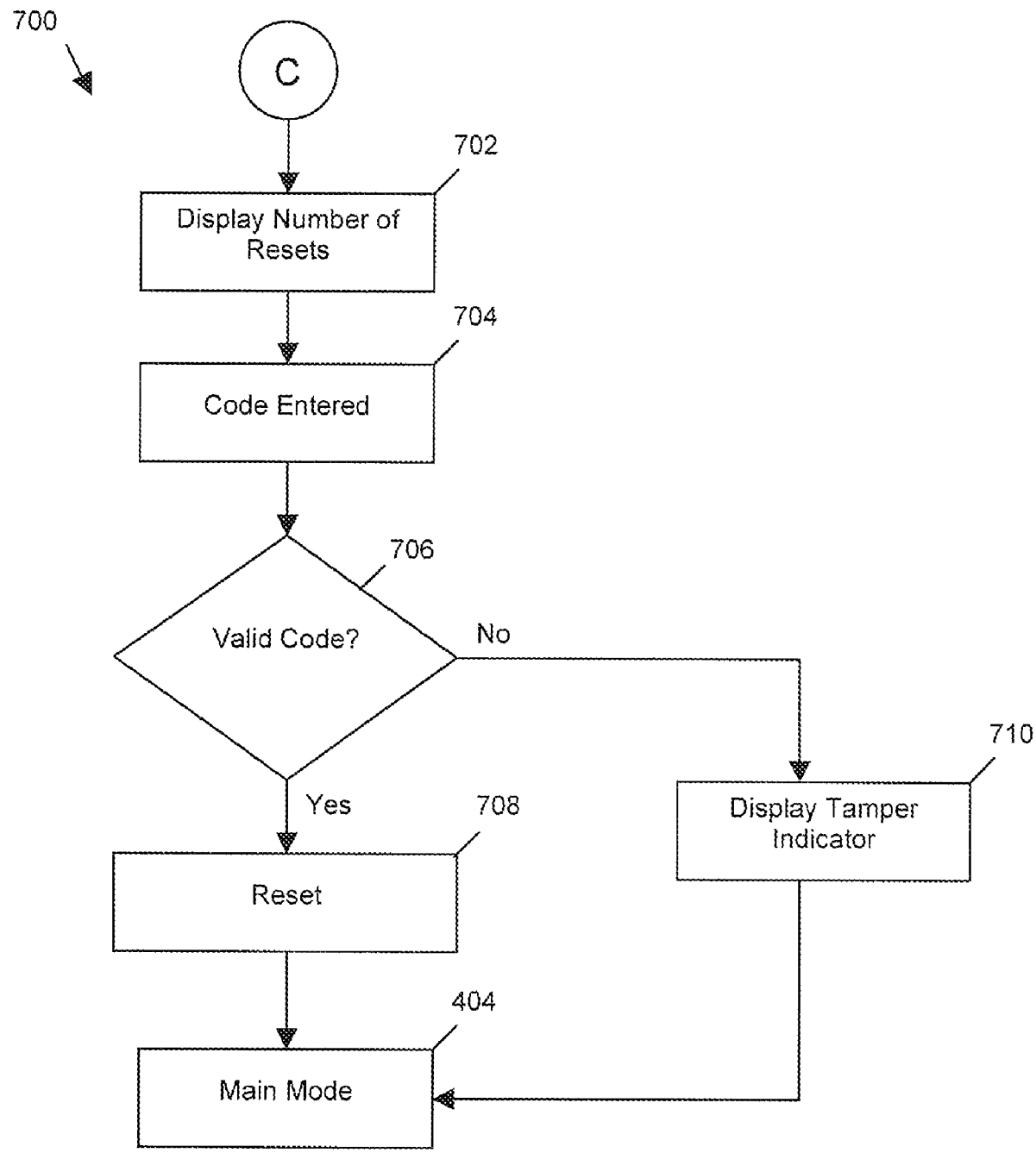
FIG. 7 is a flowchart diagram illustrating the steps for an exemplary embodiment of a method used to reset the memory on the portable device.

Referring now to FIG. 7, there is shown a flowchart diagram which illustrates an exemplary embodiment of a method 700 used to reset the portable device 100. The method 700 is initiated when the portable device 100 enters the reset mode. A user may want to reset the portable device 100, for example, each time a different driver uses the vehicle 210 in order to get driver-specific information.

At step 702, the number of resets is displayed in the braking field 330 of display 120. At step 704, the portable device 100 receives an access code from the user. The validity of this access code is checked at step 706. If it is not a valid code, the tamper indicator 334 is activated at step 710 and the portable device 100 returns to the main mode at step 404. If a valid code has been entered, the method 700 proceeds to step 708. At step 708, the statistics shown on the display 120 are reset to zero as are the values stored in memory 244 and the number of resets is increased by one.

The portable device 100 stores a reset identification number which toggles between 0 and 7 for each reset. Each time the portable device 100 sends an update request to the sensor unit 150 (step 406 of FIG. 4), it includes the reset identification number in the message. When the sensor unit 150 receives the update request, it will compare the reset identification number it receives with the message to the reset identification number it received in the most recent prior message. If the two values are different, the sensor unit 150 also resets its statistics. In order to ensure that the portable device 100 is always synchronized with the sensor unit 150, once the portable device 100 has been reset further resets are only permitted after a message has been successfully received by the portable device 100 from the sensor unit 150.

Once the portable device 100 has been successfully reset, the method 700 returns to the main mode at step 404.

Figure 8:
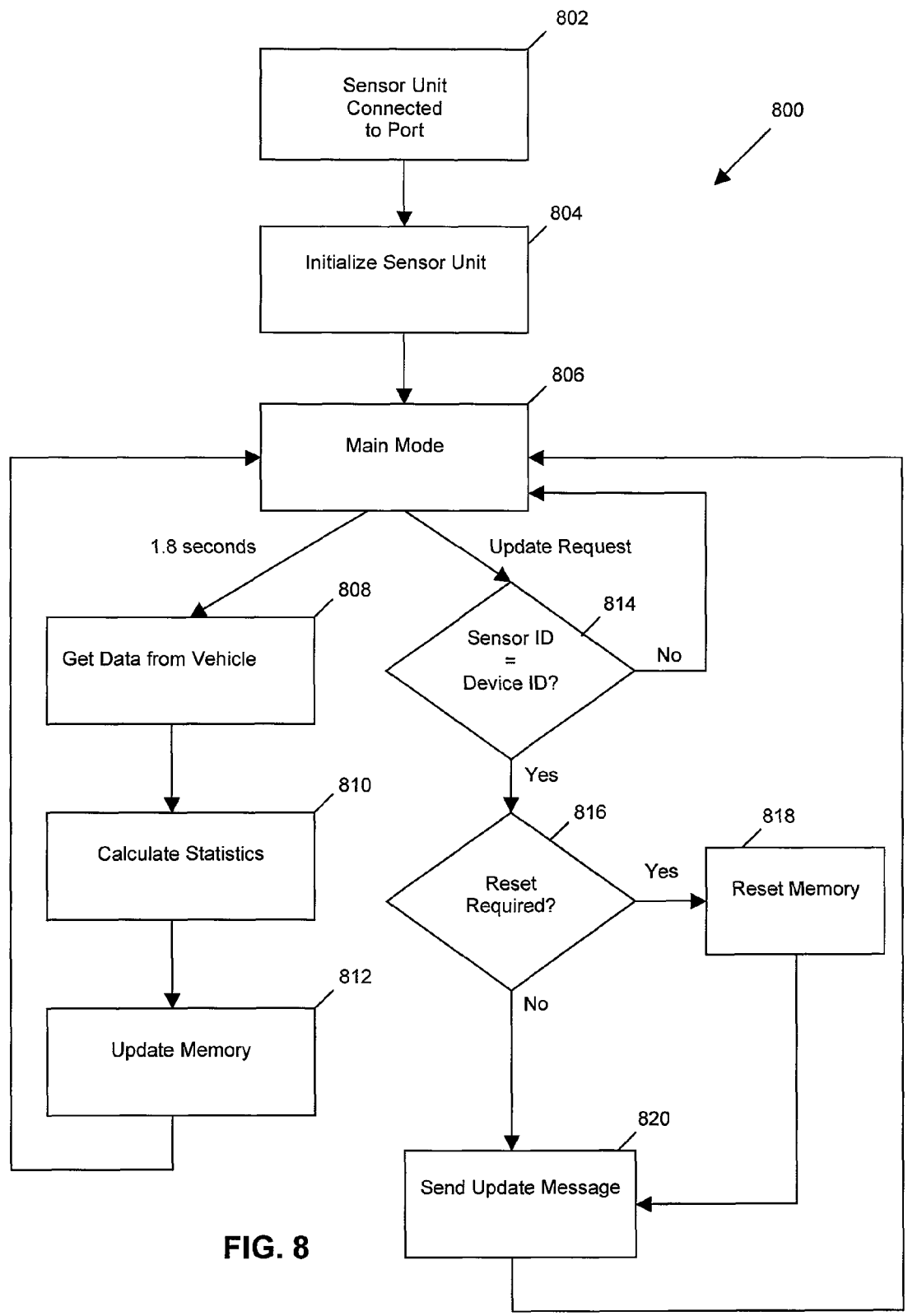
FIG. 8 is a flowchart diagram illustrating the steps for an exemplary embodiment of a method used to retrieve vehicle statistics from the vehicle, store them in the sensor unit and send updated vehicle statistics to the portable device.

Referring now to FIG. 8, there is shown a flowchart diagram that illustrates the method 800 used to retrieve vehicle statistics from the vehicle 210, store them in the sensor unit 150 and send updated vehicle statistics to the portable device 100. The method 800 is initialized at step 802 when the sensor unit 150 is attached to port 116.

At step 804, the sensor unit 150 is initialized. This includes incrementing the power cycle count used in step 410 of FIG. 4 to determine if the vehicle has been driven without the use of the sensor unit 150 as described above with reference to FIG. 4.

After the sensor unit 150 has been initialized, it enters a main mode at step 806. In the main mode, the sensor unit 150 waits until 1.8 seconds passes or until an update request is received from the portable device 100. If 1.8 seconds passes in the main mode without an update request from the portable device 100, the sensor unit 150 polls the vehicle for vehicle data, including the current speed, at step 808.

At step 810, the portable unit 150 calculates the vehicle statistics based on the new current speed. For instance, if the new current speed is greater than the maximum speed stored in the sensor unit 150, then the sensor unit 150 sets the maximum speed to the new current speed it just received from the vehicle 210. Similarly, the sensor unit stores a distance value which is a running sum calculated by summing the current velocity divided by two ($distance_m = distance_m + velocity_{km/h}/2$). The formula for the distance value is derived from the formula $distance_m = velocity_{km/h} * 1.8_s / 3600_{s/h} * 1000_{m/km} = velocity_{km/h}/2$. The number of hard brakes is incremented each time the vehicle 210 experiences a specified reduction in speed in a specified period of time. Other statistics, such as the average speed, the number of rapid accelerations and the maximum revolutions per minute (RPMs) can be determined, either based on the new current speed or from other information received from the vehicle 210 at step 808.

At step 812, the memory 234 is updated with the statistics calculated at step 810. Once the memory 234 has been updated, the method 800 returns to step 806 where the sensor unit 150 returns to the main mode of operation.

When a request for updated statistics is received from the portable device 100, the method 800 proceeds to step 814. The update request will include the device identification number of the portable device 100. At step 814, the device identification number included in the update request will be compared with the sensor identification number of the sensor unit 150. If the two device identification numbers do not match, the method 800 returns to step 806.

If the device identification number from the update request matches the sensor identification number of the sensor unit 150 then the method 800 proceeds to step 816. As mentioned with regard to FIG. 7, the portable device 100 stores a reset identification number which toggles between 0 and 7 for each reset. Each time the portable device 100 sends an update request to the sensor unit 150 (step 406 of FIG. 4), it includes the reset identification number in the message. When the sensor unit 150 receives the update request, it will compare the reset identification number it receives with the message to the reset identification number it received in the most recent prior message at step 816. If the two values are different, the sensor unit 150 resets the statistics in the memory 234 at step 818.

At step 820, a message including the updated statistics is sent to the portable device 100. The method 800 then returns to step 806.

The embodiments of the methods described above may be implemented in hardware or software, or a combination of both. However, these embodiments are typically implemented in computer programs executing on programmable devices. Program code is applied to input data to perform the functions described herein and generate output information. The output information is applied to one or more output devices, in known fashion.

Each program is implemented in a high level procedural or object oriented programming and/or scripting language. However, the programs can be implemented in assembly or machine language, if desired. In any case, the language may be a compiled or interpreted language.

While certain features of the various embodiments described herein have been illustrated and described herein, many modifications, substitutions, changes, and equivalents will now occur to those of ordinary skill in the art. It is, therefore, to be understood that the appended claims are intended to cover all such modifications.

The invention claimed is:

1. A system for monitoring a vehicle, the system comprising:
   a sensor unit connectable to an OBD-II port of the vehicle for continually collecting at least one vehicle statistic by receiving the at least one vehicle statistic from a sensor built into the vehicle, wherein the vehicle statistic is at least one of speed, distance, acceleration, deceleration, or revolutions per minute; and
   a portable device separate from the sensor unit and comprising:
      a processor configured to control the portable device and automatically (i) request and receive the at least one vehicle statistic from the sensor unit (ii) wait for a period of time after requesting and receiving the at least one vehicle statistic, and (iii) after waiting, repeat steps (i) and (ii) continuously;
      a display for continuously displaying the at least one vehicle statistic, wherein the processor is configured to repeatedly update the at least one vehicle statistic that is displayed on the display as the at least one vehicle statistic is repeatedly received by the processor; and
      a transceiver configured to communicate with the sensor unit;
   wherein the sensor unit is configured to send the at least one vehicle statistic to the portable device when it receives a request.

2. The system of claim 1, wherein the portable device comprises an attachment member for removable attachment to the keys used to operate the vehicle.

3. The system of claim 1, wherein the portable device further comprises an input mechanism.

4. The system of claim 3, wherein the input mechanism is configured to allow a user to enter an access code.

5. The system of claim 4, wherein the display is configured to display a tampering indicator when an invalid access code is received by the input mechanism.

6. The system of claim 3, wherein the input mechanism is configured to allow a user to enter a reset command.

7. The system of claim 6, wherein the portable device further comprises a memory for storing the at least one vehicle statistic and the memory is configured to reset when the reset command is received by the input mechanism followed by a valid access code.

8. The system of claim 7, wherein the memory is further configured to store a reset count of the number of times the memory has been reset and the display is further configured to display the reset count when the reset command is received.

9. The system of claim 1, wherein the sensor unit is configured to obtain the power necessary for its operations from the vehicle.

10. The system of claim 1, wherein the sensor unit comprises indicators for indicating the status of the sensor unit.

11. The system of claim 1, wherein the display has at least one field which each display at least one vehicle statistic.

12. The system of claim 11, wherein one of the fields is a maximum speed field displaying the maximum speed that the vehicle has attained.

13. The system of claim 11, wherein one of the fields is a distance field displaying the distance the vehicle has traveled.

14. The system of claim 11, wherein one of the fields is a hard brakes field displaying the number of times that the vehicle has experienced a specified reduction in speed in a specified period of time.

15. The system of claim 11, wherein one of the fields is a rapid accelerations field displaying the number of times that the vehicle has experienced a specified increase in speed in a specified period of time.

16. The system of claim 11, wherein one of the fields is a revolutions per minute field displaying the maximum number of revolutions per minute the vehicle has attained.

17. The system of claim 1, wherein the portable device is configured to operate in a main mode in which the portable device is prepared to accept input.

18. The system of claim 1, wherein the portable device further comprises a memory for storing the at least one vehicle statistic and the portable device is configured to operate in a reset mode in which the at least one vehicle statistic stored in the memory is reset.

19. The system of claim 1, wherein the portable device is configured to operate in an access code change mode in which a code used to access the portable device is changed.

20. The system of claim 1, wherein the portable device is configured to operate in a synchronization mode in which the portable device is synchronized with the sensor unit.

21. The system of claim 1, wherein the portable device is configured to operate in an update mode in which the at least one vehicle statistic is updated.

22. The system of claim 21, the portable device is configured to enter the update mode if no input is received within a predetermined amount of time.

23. The system of claim 1, wherein the portable device is a handheld device.

24. The system of claim 1, wherein the portable device is a keyfob.

25. The system of claim 1, wherein the sensor unit is configured to store a sensor identification number, the portable device is configured to store a device identification number and the sensor unit communicates with the portable device only if the sensor identification number is equal to the device identification number.

26. The system of claim 1, wherein
   (a) the portable device is configured to store a reset identification number, and to send the reset identification number to the sensor each time it requests the at least one vehicle statistic from the sensor unit; and (b) the sensor unit is configured to compare the reset identification number to a most recent prior reset identification number, and to reset a memory thereof if the reset identification number does not match the most recent prior reset identification number.

27. The system of claim 1, wherein the portable device is further configured to shut down if it does not receive the at least one vehicle statistic from the sensor unit within a second period of time.

28. The system of claim 1, wherein the display is configured to display a tampering indicator for indicating when the system has been tampered with.

29. The system of claim 28, wherein the sensor unit is further configured to store a count of the number of times the sensor unit has been connected to the vehicle and the portable device is further configured to store a latest count received from the sensor unit and to display a tampering indicator when the count and the latest count do not match.

30. A portable device for displaying at least one vehicle statistic for a vehicle, the portable device comprising:
   a transceiver configured to communicate with a separate sensor unit that is connectable to an OBD-II port of the vehicle and continually collects at least one vehicle statistic by receiving the at least one vehicle statistic from a sensor built into the vehicle;
   a processor configured to control the portable device and automatically (i) request and receive the at least one vehicle statistic, (ii) wait for a period of time after requesting and receiving the at least one vehicle statistic, and (iii) after waiting, repeat steps (i) and (ii) continuously; and
   a display for continuously displaying the at least one vehicle statistic, wherein the processor is configured to repeatedly update the at least one vehicle statistic that is displayed on the display as the at least one vehicle statistic is repeatedly received by the processor;
wherein, the portable device is a handheld device; and
wherein the vehicle statistic is at least one of speed, distance, acceleration, deceleration, and revolutions per minute.

31. The portable device of claim 30, further comprising an input mechanism.

32. The portable device of claim 31, wherein the input mechanism is configured to receive an access code.

33. The portable device of claim 32, wherein the display is configured to display a tampering indicator when an invalid access code is received by the input mechanism.

34. The portable device of claim 33, wherein the at least one field comprises a maximum speed field displaying the maximum speed that the vehicle has attained.

35. The portable device of claim 31, wherein the input mechanism is configured to receive a reset command.

36. The portable device of claim 35, further comprising a memory for storing the at least one vehicle statistic and the memory is configured to reset when the reset command is received by the input mechanism followed by a valid access code.

37. The portable device of claim 36 wherein the memory is further configured to store a reset count of the number of times the memory has been reset and the display is further configured to display the reset count when the reset command is received.

38. The portable device of claim 30, wherein the display is configured to display a tampering indicator for indicating when the portable device has been tampered with.

39. The portable device of claim 30, wherein the display has at least one field which each display at least one vehicle statistic.

40. The portable device of claim 39, wherein the at least one field comprises a distance field displaying the distance the vehicle has traveled.

41. The portable device of claim 39, wherein the at least one field comprises a hard brakes field displaying the number of times that the vehicle has experienced a specified reduction in speed in a specified period of time.

42. The portable device of claim 30, wherein the portable device is configured to operate in a main mode in which the portable device is prepared to accept input.

43. The portable device of claim 42, wherein the portable device further comprises a memory for storing the at least one vehicle statistic and the portable device is configured to operate in a reset mode in which the at least one vehicle statistic stored in memory is reset.

44. The portable device of claim 43, wherein the memory is further configured to store a device access code used to access the portable device and the portable device is configured to operate in an access code change mode in which the device access code is changed.

45. The portable device of claim 44, wherein the portable device is configured to operate in a synchronization mode in which the portable device is synchronized with the sensor unit.

46. The portable device of claim 44, wherein the reset mode further comprises:
   receiving an input access code;
   validating the input access code;
   if the input access code is valid, resetting the memory of the portable device; and
   returning to the main mode.

47. The portable device of claim 46, wherein the access code change mode further comprises:
   receiving an input access code;
   validating the input access code;
   if the input access code is valid, updating the device access code; and
   returning to the main mode.

48. The portable device of claim 47, wherein updating the device access code comprises:
   receiving a first new access code;
   receiving a second new access code;
   comparing the first new access code to the second new access code; and
   if the first new access code and the second new access code are identical, saving the first new access code as the device access code.

49. The portable device of claim 47 wherein the synchronization mode further comprises:
   receiving an input access code;
   validating the input access code; and
   if the input access code is valid, synchronizing the portable device and the sensor unit.

50. The portable device of claim 49, wherein the portable device further comprises a device identification number and synchronizing the portable device and the sensor unit comprises:
   sending a synchronization message to the sensor unit;
   receiving a synchronization response from the sensor unit including a sensor identification number;
   comparing the sensor identification number to the device identification number; and
   if the sensor identification number and the device identification number are identical, indicating that the synchronization has passed and returning to the main mode.

51. The portable device of claim 50, wherein the portable device is configured to communicate with the sensor unit only after the portable device and the sensor unit have been synchronized.

52. The portable device of claim 49, wherein validating the input access code comprises comparing the input access code to the device access code and determining if they are equal.

53. The portable device of claim 43, wherein the portable device is configured to operate in an update mode in which the at least one vehicle statistic is updated.

54. The portable device of claim 53, wherein the portable device is configured to enter the update mode if no input is received within a predetermined amount of time.

55. The portable device of claim 30, wherein the portable device comprises an attachment member for removable attachment to the keys used to operate the vehicle.

56. The portable device of claim 30, wherein the portable device is a keyfob.

* * * * *